US009512633B2

(12) United States Patent
 Marron

(10) Patent No.: US 9,512,633 B2
(45) Date of Patent: Dec. 6, 2016

(54) BRACKET ATTACHMENT SYSTEM

(71) Applicant: Best Metal Fence, LLC, Nevada, TX (US)

(72) Inventor: Timothy Marron, Grapevine, TX (US)

(73) Assignee: BEST METAL FENCE, LLC, Nevada, TX (US)

( * ) Notice: Subject to any disclaimer, the term of this patent is extended or adjusted under 35 U.S.C. 154(b) by 352 days.

(21) Appl. No.: 14/161,486

(22) Filed: Jan. 22, 2014

(65) Prior Publication Data

US 2014/0231739 A1    Aug. 21, 2014

Related U.S. Application Data

(60) Provisional application No. 61/762,089, filed on Feb. 7, 2013.

(51) Int. Cl.
 *E04H 17/14* (2006.01)
 *F16B 2/12* (2006.01)
 *F16B 9/02* (2006.01)

(52) U.S. Cl.
 CPC .......... *E04H 17/1421* (2013.01); *F16B 2/12* (2013.01); *F16B 9/023* (2013.01); *E04H 2017/1473* (2013.01)

(58) Field of Classification Search
 CPC .......... E04H 17/1413; E04H 17/1417; E04H 17/1421; E04H 2017/1447; E04H 2017/1452; E04H 2017/1473; E04H 2017/1491
 See application file for complete search history.

(56) References Cited

U.S. PATENT DOCUMENTS

| | | | | | |
|---|---|---|---|---|---|
| 3,092,407 | A | * | 6/1963 | Blonder | E04G 7/02 256/65.05 |
| 3,278,164 | A | * | 10/1966 | Leyendecker | E04H 17/1434 256/24 |
| 3,960,367 | A | * | 6/1976 | Rogers | E04H 17/1434 248/230.9 |
| 5,402,987 | A | * | 4/1995 | Duyck | E01F 15/0453 256/13.1 |
| D374,607 | S | * | 10/1996 | Shoda | D8/382 |
| 6,802,496 | B1 | * | 10/2004 | Preta | E04H 17/1413 16/253 |

FOREIGN PATENT DOCUMENTS

FR    2 896 282    *    7/2007    ............. E04H 17/14

* cited by examiner

*Primary Examiner* — Michael P Ferguson
(74) *Attorney, Agent, or Firm* — Sul Lee PLLC

(57) ABSTRACT

The present disclosure is related to a universally adjustable metal two bracket attachment system for metal fence posts to attach various types of fencing materials or fence sections is disclosed. The subject metal fence post attachment bolt and bracket system is simple and easy to install, is universally adjustable to round or square metal fences posts, by bolting onto the "off the shelf" non-adjustable fence post brackets. The subject brackets allow both full section metal fencing with the bracket mounted with the open end sideways, and three rail metal fencing with the bracket facing up.

6 Claims, 5 Drawing Sheets

BRACKET ATTACHMENT SYSTEM

CROSS-REFERENCE TO RELATED APPLICATIONS

This Application claims the benefit of priority to U.S. Provisional Application No. 61/762,089, filed on Feb. 7, 2013, which is herein incorporated by reference in its entirety.

TECHNICAL FIELD

Embodiments of the present disclosure are related to a bracket system for fence posts to attach various types of fencing materials or fence sections.

BACKGROUND

Difficulties may exist in installing fences when there is unequal spacing between fence posts. Unequal spacing between fence posts may happen by ground conditions, shapes of the overall fences, or other reasons. Currently, mounting bracket systems in the market are allows a little or no movement to fix this problem. Besides the difficulty in installing fences, unequal spacing between fence posts is not aesthetically pleasing. There have been attempts to solve the problem using various devices. However, these other devices have not been successful in adjusting uneven field fence installation to completely solve the problems. In addition, these devices may require additional components to install, and therefore require extra labor and create aesthetically not pleasing end-products. The current subject fence post attachment bracket system provides a solution because it is simple and elegant to install. Moreover, embodiments the present disclosure are universally adjustable to round or square metal fence posts, by bolting onto "off the shelf" non-adjustable fence post brackets for various fence materials such as metal fence sections or three rail metal fences.

SUMMARY

Embodiments of the present disclosure are related to a bracket attachment system comprising of a first angled panel; and a second angled panel identical to the first angled panel, wherein each angled panel comprises a first end planar section comprising a first hole, an angled planar section, and a second end planar section comprising a second hole, wherein an edge of the angled planar section is also an edge of the first end planar section such that the first end planar section and the angled planar section form a first obtuse angle, wherein the opposite edge of the angled planar section is also an edge of the second end planar section such that the second end planar section and the angled planar section form a second obtuse angle that is substantially the same as the first obtuse angle, wherein the first end planar section and the second end planar section are substantially parallel, and wherein the first and second angled panels are oriented in a mirror image such that the first and second holes are aligned, and such that the space between the first end planar sections is narrower than the space between the second end planar sections. The second end planar sections of the first and second angled panels include at least one hole, in a preferred embodiment is in an oval shape elongated in an orientation lateral to the respective angled panels.

The present attachment system may use various means to connect the first and second angled panels. The first end planar section with a first hole of the first and second angled panels is mounted to a bracket attached to a fence post. The second end planar sections of the first and second panels are mounted to a fence, fence material, channel, rail or other parts of fence.

DETAILED DESCRIPTION

Some embodiments of the present disclosure address the problem of unequal spacing between fence posts used for various types of fencing, especially for mounting brackets for fence posts that are not adjustable to fix the unequal spacing between the fence posts in installing fence. As stated above, the common problem in installing fences is that there is usually unequal spacing between the metal fence posts and currently available mounting bracket systems does not allow enough movement to easily install the fence. An embodiment of the present disclosure solves this problem by providing easier installation of fences that use fence posts. An embodiment of the present disclosure is a bracket attachment system that adjusts the space between the fence posts that are uneven or unequal. Again, the subject bracket attachment system solves the problems by allowing the easy installation of various types of fencing using metal fence posts and by easily adjusting many uneven or unequal spaced posts for fencing installations. Throughout the present disclosure, the phrase "attached to" is used to broadly describe various embodiments. It is noted that "attached to" may also mean "joined to", "fastened to", "fixed to", "connected to", "linked to", "secured to", "appended to", "coupled to", "bound to", "hitched to", "riveted to", or other equivalents thereof.

Figure 1:
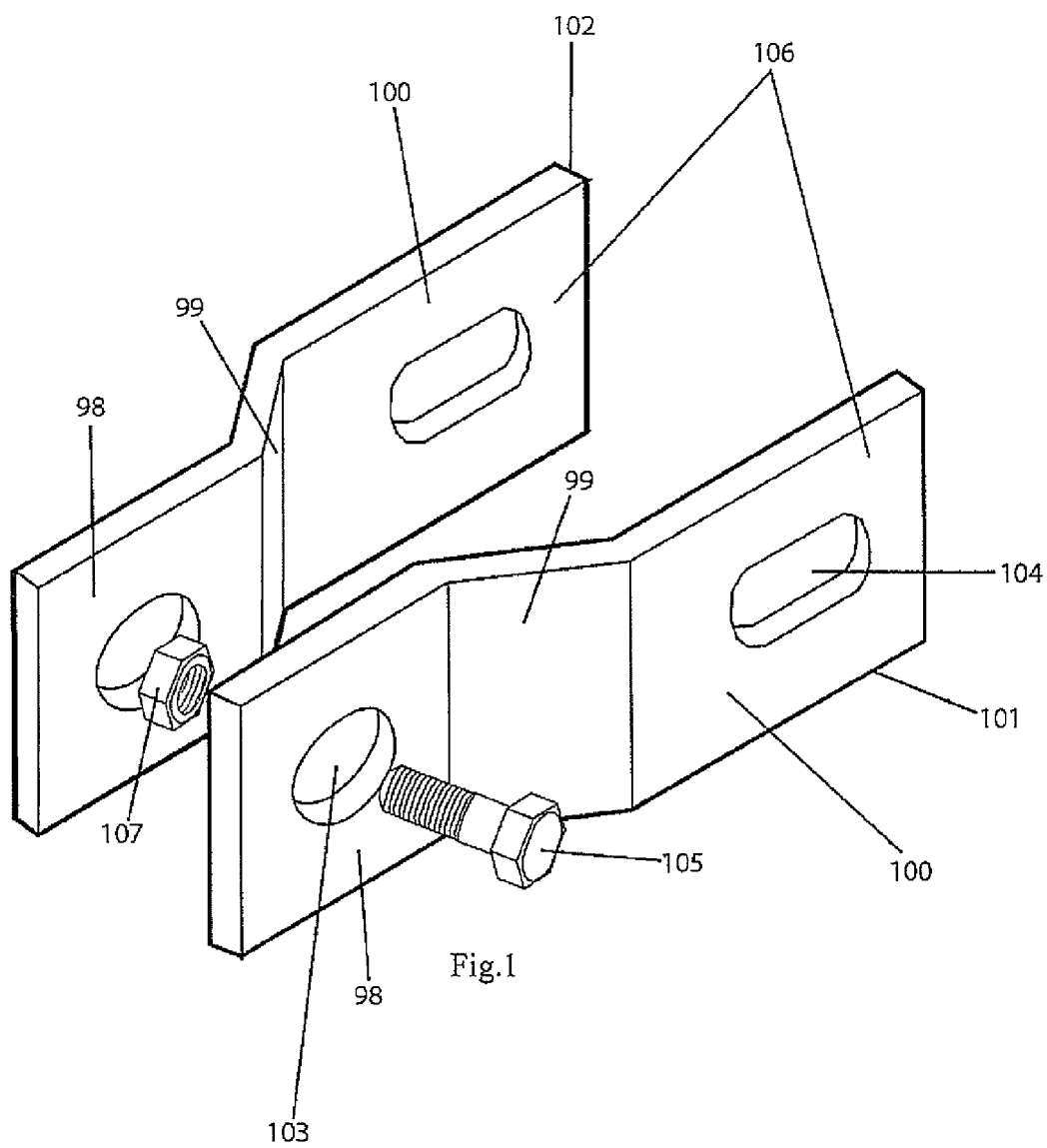
FIG. 1 is a bracket attachment system for fence posts to attach various types of fencing materials according to an embodiment of the present disclosure.

An embodiment of the present disclosure provides an improvement on what currently exists. In one aspect of the present disclosure, the subject bracket attachment system is better because of the ease of adjusting the height and width of the "off the shelf" bracket used to attach (or fasten or fix or mount) the fence section to round or square fence posts now typically used. Other currently available fence brackets have little adjustment for the installation of various types of fence sections and thus, make the fence installation more difficult when there is unequal spacing between the fence posts. An embodiment of the present disclosure is elegant, easy to install, and universally adjustable to round or to square metal fence posts, by being able to be attached to (or fastened to, or fixed to, or mounted to) this "off the shelf" non-adjustable fence post brackets. Also, an embodiment of the present disclosure is applicable to various types of fences such as metal fence sections or three rail metal fences. In one aspect of the present disclosure, an embodiment prevents wearing off the fences due to weather conditions by allowing movement of fences for wind and storm and thereby, preventing fences from cracking or breaking apart. In another aspect, an embodiment of the present disclosure provides more support for the fence material by holding the fence from the bottom, top, or sides. In yet another aspect, an embodiment of the present disclosure creates aesthetically more pleasing look by providing visually a similar or identical look for the front and back sides FIG. 1 is a bracket attachment system 106 for fence posts to attach various types of fencing materials according to an embodiment of the present disclosure. The bracket attachment system 106 comprises of a bracket system front panel 101, a bracket system back panel 102, and a connecting mechanism connecting the bracket system front panel 101 and the bracket system back panel 102. Both the bracket system front panel 101 and back panel 102 include a first end planar section 98 comprising a first hole 103, an angled planar section 99, and a second end planar section 100 comprising a second hole 104. The bracket system front panel 101 and the bracket system back panel 102 are oriented in a mirror image such that the first holes 103 of the bracket system front and back panels 101 and 102 are aligned, second holes 104 of the bracket system front and back panels 101 and 102 are aligned, and such that the space between the first end planar sections 98 are narrower than the space between the second end planar sections 100.

In this embodiment, a connecting mechanism of a bolt 105 and a nut 107 is used. The bracket system front panel 101 includes at least two holes, first hole 103 and second hole 104. The bracket system back panel 102 also includes at least two bolt holes, first hole 103 and second hole 104. The bolt holes on the bracket system back panel 102 are located in identical or similar locations as in the bolt holes 103 and 104 in the front metal mounting panel 101. As stated above, these holes are oriented in a mirror image so the holes can align to each other. Threads may be included in the bolt holes. In this embodiment, the bolt hole 103 is in a circular shape and the bolt hole 104 is in an oval shape. In the preferred embodiment, the bolt hole 103 is used to attach the bracket attachment system 106 to the "off the shelf bracket," and the bolt hole 104 is used to attach the bracket attachment system 106 to the fence material. The oval shape of the bolt hole 104 provides an extra space for the bracket attachment system 106 to adjust the unequal spacing between fence posts and allows movement of the fence material. In connecting the bracket attachment system 106 to the fence material, a connecting mechanism of bolt and nut as shown in 105 and 107 may be used through the bolt hole 104. The bracket system front panel 101 and the bracket system back panel 102 may be made of various materials including metal, steel, and other composite. Also the bracket system front panel 101 and the bracket system back panel 102 may be in various thicknesses depending on the user's need. Users may also coat the bracket attachment system 106 with materials that are water-resistant such as poly vinyl or wax to prevent the bracket attachment system 106 from corrosion.

Figure 2:
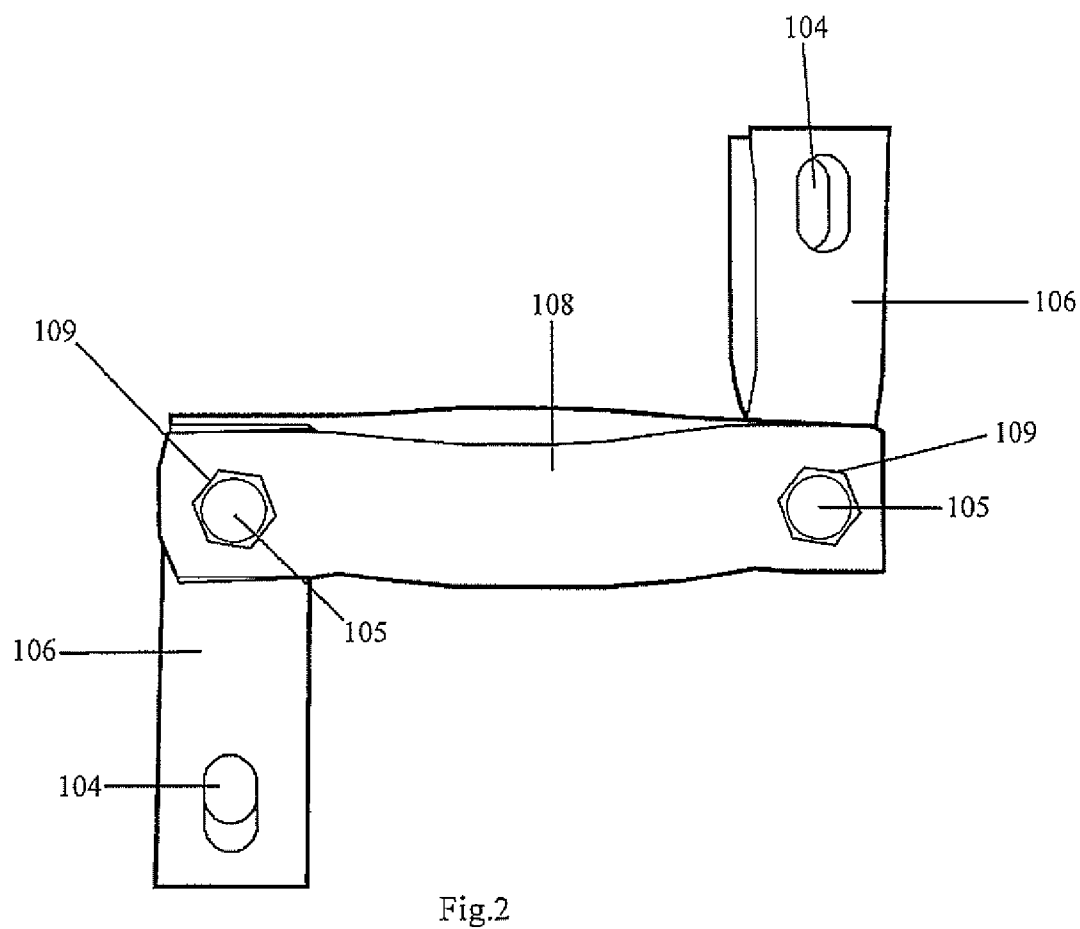
FIG. 2 is a bracket attachment system attached to an "off the shelf" non-adjustable fence post brackets according to an embodiment of the present disclosure.

FIG. 2 is a bracket attachment system, the bracket attachment system 106, attached to (fastened to, or fixed to, or mounted to) a "off the shelf" non-adjustable fence post bracket according to an embodiment of the present disclosure. In this embodiment, an "off the shelf" non-adjustable fence post bracket 108 has two bolt holes 109 wherein bolt 105 can be inserted to connect the bracket attachment system 106. In FIG. 2, the bracket system 106 is attached though the first holes 103 in the bracket panels 101 and 102 and the bolt hole 109 in the off the shelf bracket 108. A bolt 105 and nut 107 is used as a connecting mechanism. The bracket attachment system 106 can be attached to (e.g. fastened to, or fixed to, or mounted to) fence material at any angle as the user desires. The fence material is attached to the bracket attachment system 106 through the second hole 104 using a connecting mechanism of bolt 105 and nut 107. In this embodiment, the bracket attachment system 106 attached to the right side of the "off the shelf" non adjustable bracket 108 is facing upward while another bracket attachment system 106 attached to the left side of the "off the shelf" non adjustable bracket 108 is facing downward. A fence post is inserted to the empty space in the middle of the "off the shelf" non adjustable bracket 108.

Figure 3:
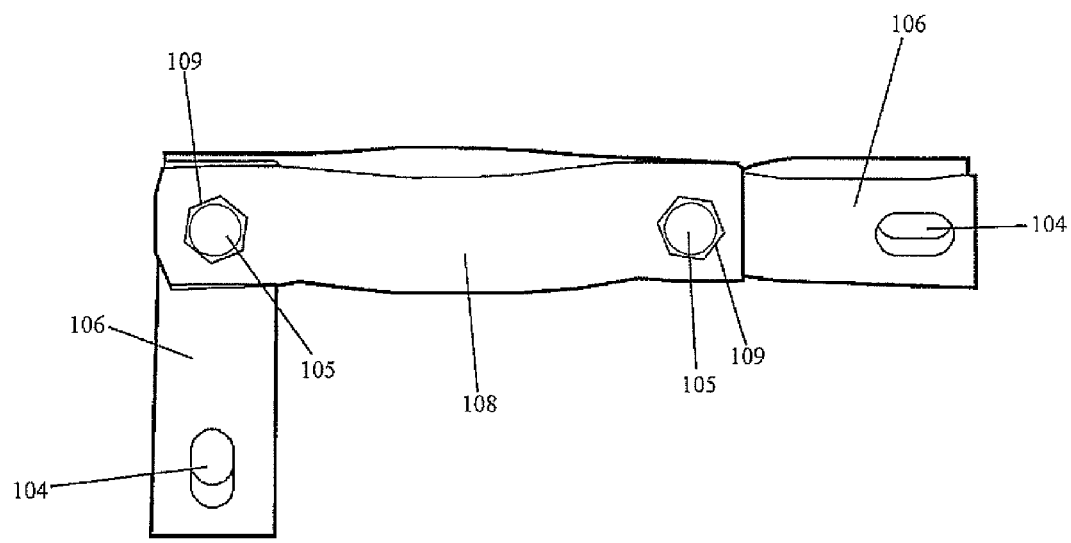
FIG. 3 is an example of a bracket attachment system attached to an "off the shelf" non adjustable fence post brackets according to an embodiment of the present disclosure.

FIG. 3 illustrates an example of the bracket attachment system 106 attached to (or fastened to, or fixed to, or mounted to) an off the shelf non adjustable bracket 108 at a different angle, according to an embodiment of the present disclosure. As previously shown in FIG. 2, in an embodiment, the bracket attachment system 106 is attached by the connecting mechanism of a bolt 105 and a nut 107 through the bolt hole 109 in the "off the shelf" non adjustable bracket 108. As shown, flexibility of the bracket attachment system 106, which allows it to be attachable to the "off the shelf" non-adjustable bracket 108 at any angle, makes the bracket attachment system 106 adjust the unequal spacing between the fence posts. Also, the angle adjustment of the bracket attachment system 106 is a one of the key features that makes the installation of the fence easier. This feature is especially useful when the fence is installed on uneven grounds such as hills or when the overall shape of the fence is an oval or circle. Also, by allowing the user to attach the bracket attachment system 106 at a desired angle, the user may create a visually smooth surface line of fences. In addition, when a user is replacing only part of the fence sections, an embodiment of the present disclosure makes the installation more convenient by adjusting the space between the fence post and the fence section. In FIG. 3, the bracket attachment system 106, attached to the right side of the "off the shelf" non-adjustable bracket 108, is facing right while the bracket attachment system 106 attached to the left side of the "off the shelf" non adjustable bracket 108 is facing down. The bracket attachment system 106, which is turned up, may act as a receiving saddle for a three rail fence. The bracket attachment system 106 holds up the weight of the metal fence rail pieces with the open end up while the side-turned bracket attachment system 106 may hold the normal full fence section. There would be three brackets per fence post with the three rail system versus, two as with the normal fence section.

Figure 4:
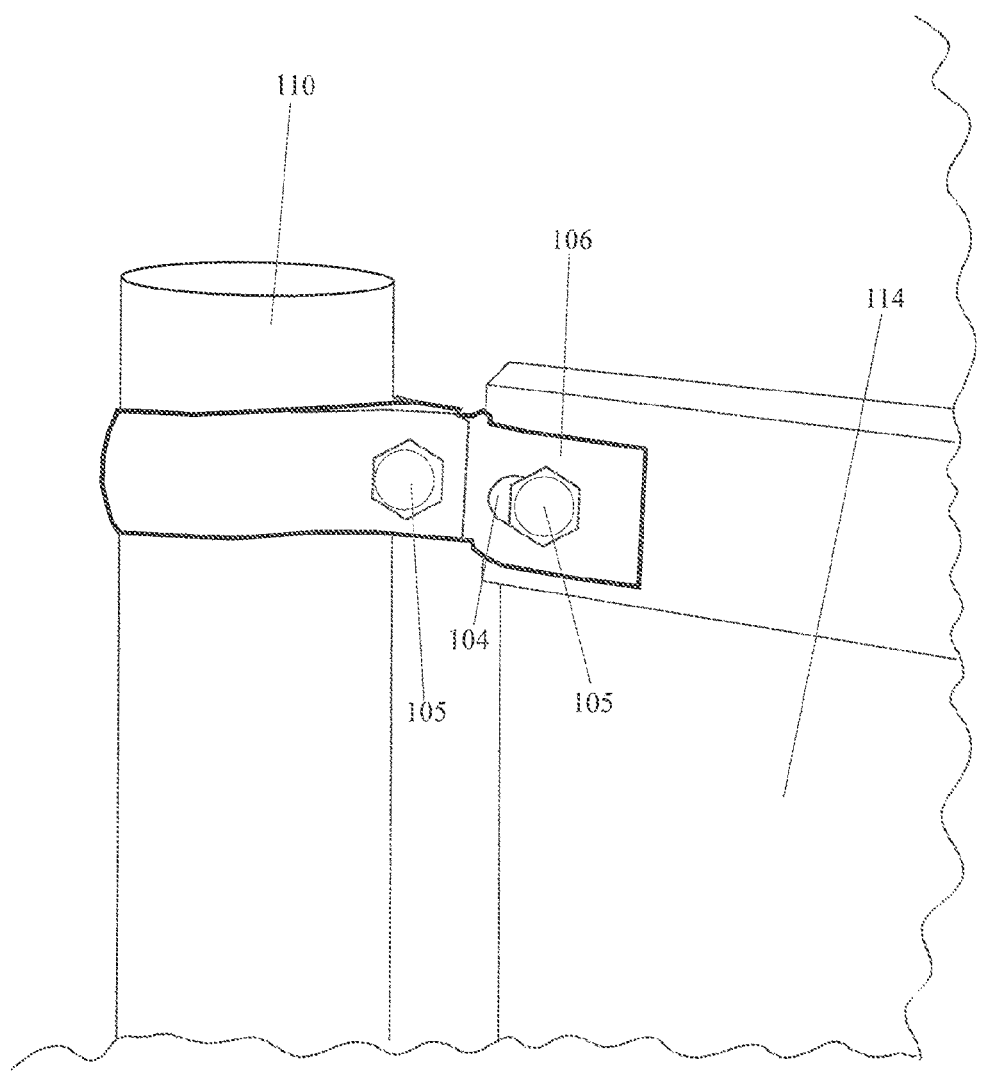
FIG. 4 illustrates a bracket attachment system connected to a fence post according to an embodiment of the present disclosure.

FIG. 4 illustrates a bracket attachment system 106 connected to a fence post 110 and a fence 114 according to an embodiment of the present disclosure. The fence post 110 is inserted to the "off the shelf" non-adjustable bracket 108. The bracket attachment system 106 is attached to the "off the shelf" non-adjustable fence post bracket 108. The bracket attachment system 106 is attached to the off the shelf non-adjustable fence post bracket 108 via the connecting mechanism of a bolt 105 and nut 107 through the hole 103. In this embodiment, a fence 114 is attached through the second hole 104, which is an oval shape, using a bolt 105. The oval shape second hole 104 allows the bolt 105 to move from side to side preventing the fence 114 from cracking or breaking due to wind or storm. Also the oval shape of the second hole 104 allows the user to adjust the width of fence when there is unequal spacing between the fence posts 110.

Figure 5:
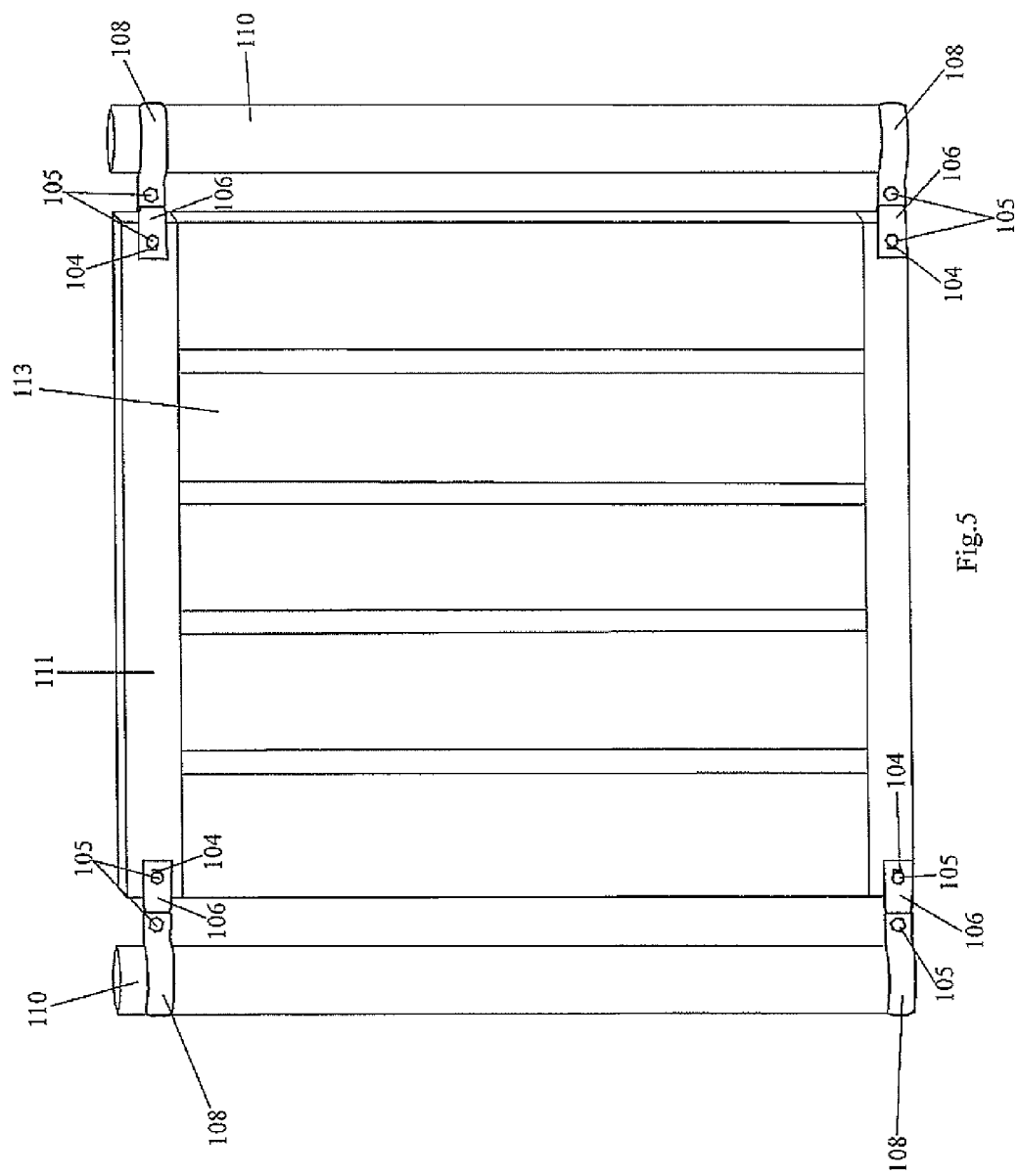
FIG. 5 illustrates a bracket attachment system in assembled conditions to the fence post with a channel of a fence section attached, according to an embodiment of the present disclosure.

FIG. 5 illustrates an overview of a bracket attachment system applied to a fence installation according to an embodiment of the present disclosure. The left side of the current bracket attachment system. 106 is attached to the "off the shelf" non-adjustable bracket 108, which is connected to the fence post 110, using the connecting mechanism of the bolt 105 and the nut 107 via the first hole 103. The left side of the bracket attachment system 106 is connected to the fence 114 using the connecting mechanism of bolt 105 via the oval shaped second hole 104. In this embodiment, the fence 114 is made up a channel 111 and fence materials 113. In this embodiment, two sets of the bracket attachment system 106 installed on the fence post 110. In an embodiment, users may use a housing to cover the bracket attachment system and to create an aesthetically more pleasing look. In a different embodiment, instead of a channel, a rail may be used.

An embodiment of the present disclosure includes:
1. A front metal mounting adjustable bracket panel 1 for metal fence posts;
2. A rear metal mounting adjustable bracket panel 2 for metal fence posts;
3. Two or more steel threaded bolts, varying thickness and length;
4. Two or more steel nuts for item #3 bolts.
5. Two or more steel washers for item #3 bolts In an embodiment, the relationship between the components of the bracket attachment system is as follows: the bracket system front panel 101 is bolted to the bracket system back panel 102 through the first hole 103 in the narrow end of the bracket panels 101 and 102 using a steel bolt 105 through the "off the shelf" bracket 108 (already installed around a steel fence post 110) using two steel washers and tightened down with two steel nuts 107 on the ends of the bolts, with the wider angled subject brackets ends to allow movement of the bolt when bolting the subject brackets to the metal or wood fence sections to meet the variable needs of fence building in the field where posts may not be perfectly plumb or equally spaced and need some adjustment at the post attachment. In this embodiment, the two subject bracket systems per post with two bolts and bolts for each two subject bracket piece system are used to perform that adjustment with the oval larger second hole 4 in one side of the bracket system at the fence section. The subject bracket system 6 is bolted to a metal fence post "off the shelf" readily available typical bracket 8. The subject bracket system of two angled brackets is used to attach a metal or wood fence section to the "off the shelf" bracket 8 (which is already bolted around the post). The front and rear subject brackets panels are drilled with bolt holes with an adjustable oval hole in the wider angled ends to allow movement of the bolt when bolting the subject brackets to the metal or wood fence sections to meet the variable needs of fence building in the field where posts may not be perfectly plumb or equally spaced and need some adjustment at the post attachment. The two subject bracket system per post with two bolts and bolts for each two subject bracket piece system are used to perform that adjustment with the oval larger bolt hole in one side of the bracket system at the fence section. The wider side of the subject bracket metal pieces is used to attach the fence section of pickets by bolting together the fence section to the adjustable wider ends of the brackets. The subject brackets can also be turned 90 degrees to act as a receiving saddle for a three rail appearance fence. The brackets hold up the weight of the metal fence rail pieces with the open end up versus to the side with the normal full fence section. In one embodiment, there would be three brackets per fence post with the three rail system versus, two as with the normal fence section.

How to make the bracket attachment system: According to some embodiments of the present disclosure, a fence builder/installer would first set the steel fence posts needed for the metal wood fence sections with the proper spacing between the posts. Installer would bolt on the "off the shelf" post brackets around the post using the typical two bolts and curved bracket system sold at retail stores now. The bracket attachment system would then have the front and rear angled metal brackets panels bolted at the narrow end single round hole section to the "off the shelf" post bracket so the subject bracket system's wider end with the oval adjustable hole end could accept the fence section which would then be bolted to the subject brackets. In a preferred embodiment, there can be two subject bracket systems, one at the top and one at the bottom of the fence section, for attaching the fence section to the post. If using the three rail system of metal fencing vs. the normal full fence section, then there would be three brackets per posts to hold the three rails, with the brackets being installed open end up to support a portion of a horizontal rail, then bolted to the rail piece with the same type bolts as above. Lock bolts or lock washers could be used to make the bolting attachments more secure. The single round hole in the narrow end of the subject brackets where they are bolted to the "off the shelf" post bracket, could be larger, but may negatively impact the secure attachment of the subject bracket to the "off the shelf" bracket at that point.

How to use the bracket attachment system: A person would use the subject bracket system to attach the fence section to an already installed "off the shelf" metal post bracket, by bolting the subject brackets to the fence section at the adjustable ends. This would allow the person to adjust the width and height of the attachment point of the fence section if there was uneven spacing or out of plumb fence post conditions existing in the field.

Also, it can create: the subject fence metal bracket attachment system can produce fences and fencing systems that require an adjustable installation. Also the brackets allow a three rail metal fencing application as well as a full 6' or 8' high typical full metal fence section.

What is claimed is:
1. A bracket attachment system comprising:
a first angled panel; and
a second angled panel identical to the first angled panel, wherein each angled panel comprises:
a first end planar section comprising a first hole,
an angled planar section, and
a second end planar section comprising a second hole,
wherein an edge of the angled planar section is also an edge of the first end planar section such that the first end planar section and the angled planar section form a first obtuse angle,
wherein an opposite edge of the angled planar section is also an edge of the second end planar section such that the second end planar section and the angled planar section form a second obtuse angle that is substantially the same as the first obtuse angle,
wherein the first end planar section and the second end planar section are substantially parallel, and wherein the first and second angled panels are separate pieces and oriented in a mirror image such that the first and second holes are aligned, the space between the first end planar sections being narrower than the space between the second end planar sections, such that a bracket attached to a substantially vertical post is mounted to the first holes of the first end planar sections of the first and second angled panels via a fastener extending through the first holes aligned in the first and second angled panels, and at least one fence rail or panel material is mounted between the second end planar sections of the first and second angled panels via a fastener extending through the second holes aligned in the first and second angled panels.

2. The bracket attachment system of claim 1, wherein the second hole is an oval-shaped hole.

3. The bracket attachment system of claim 2, wherein the oval-shaped hole is elongated in an orientation lateral to the respective angled panel.

4. The bracket attachment system of claim 1, wherein the first and second angled panels are oriented vertically such that an open end of the space between the second end planar sections faces up.

5. The bracket attachment system of claim 1, wherein the at least one fence rail or panel material comprises a substantially horizontal channel and substantially vertical fence panel.

6. The bracket attachment system of claim 1 wherein the at least one fence rail or panel material comprises a rail.

* * * * *